April 17, 1928. 1,666,087
F. E. COLLIER
TILTING SAW GUIDE
Filed March 19, 1927

Inventor
Freeman E. Collier
By his Attorneys
Merchant and Kilgore

Patented Apr. 17, 1928.

1,666,087

UNITED STATES PATENT OFFICE.

FREEMAN E. COLLIER, OF MINNEAPOLIS, MINNESOTA, ASSIGNOR TO FOLEY SAW TOOL COMPANY, INCORPORATED, OF MINNEAPOLIS, MINNESOTA, A CORPORATION OF MINNESOTA.

TILTING SAW GUIDE.

Application filed March 19, 1927. Serial No. 176,660.

My present invention relates to a saw filing machine and, more particularly to a saw-tilting guide therefor, especially adapted as an attachment for the saw filing machine disclosed and broadly claimed in my co-pending application executed of even date herewith. Said attachment is designed for use in holding a band saw or a similar saw, in which the teeth are under-cut, in a manner to permit a file to clear itself from the teeth during the saw filing and saw feeding actions.

Generally stated, the invention consists of the novel devices and combinations of devices hereinafter described and defined in the claims.

In the accompanying drawings, which illustrate the invention, like characters indicate like parts throughout the several views.

Referring to the drawings.

Figure 1:
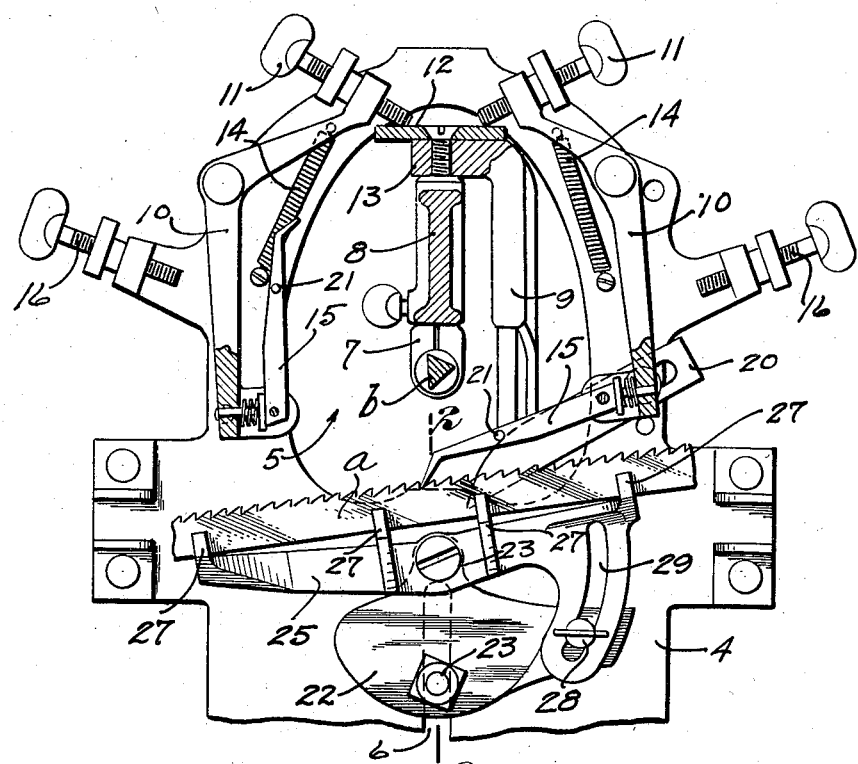
Fig. 1 is a fragmentary front elevation of a saw filing machine with some parts shown in transverse vertical section, and having the saw-tilting guide attachment applied thereto.
Figure 2:
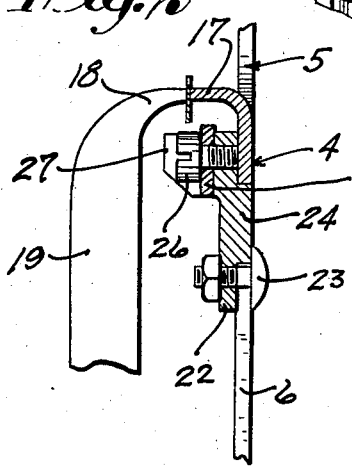
Fig. 2 is a fragmentary view partly in side elevation and partly in vertical section taken on the line 2—2 of Fig. 1.
Figure 3:
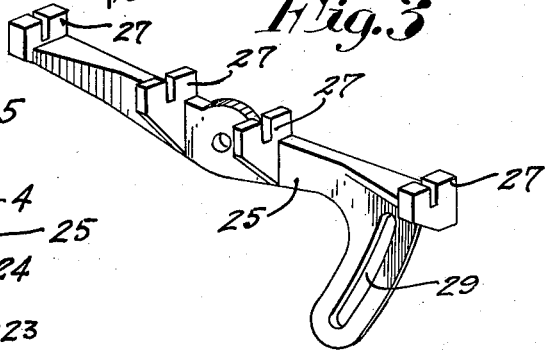
Fig. 3 is a perspective view of the saw-tilting guide removed from its support.

Referring first to the saw filing machine illustrated, to which the saw-tilting guide attachment is applied, the numeral 4 indicates a fixed plate having a large opening 5, and below said opening a vertical slot 6.

For sharpening the teeth of a band saw or cutting new teeth in the blade thereof, an ordinary three-sided file $b$ is used and which file is mounted in a carrier 7 on the forwardly projecting arm 8 of the crosshead, not shown, which may be manually or motor-operated. It may be here stated that the crosshead is mounted for angular adjustment to position the file at right angles to a saw blade, or at an angle thereto. Said crosshead is also mounted to impart to the file endwise and up and down movements. The numeral 9 indicates a secondary crosshead guide which is mounted to impart to the crosshead its up and down movements.

Step by step feed movement is automatically imparted to the saw $a$ by a pair of reversely-acting bell-crank-shaped levers 10 intermediately pivoted to the face plate 4. On the opposing upper ends of the levers 10 is mounted a pair of reversely oblique screws 11 that afford adjustable contacts which engage a tappet plate 12 on an arm 13 formed with the forward upper end of the secondary crosshead guide 9. Coil springs 14 tend to yieldingly hold the levers 10 with the screws 11 bearing on the tappet plate 12.

Reversely-acting driving dogs 15 are pivoted to the lower ends of the levers 10 and are adapted to engage the teeth of the saw $a$ to impart the feeding action to the saw. These dogs 15 are yieldingly held in an operative position as shown at the right in Fig. 1, and an inoperative position as shown at the left of said figure. Stop screws 16 for the levers 10 are mounted in the face plate 4.

A clamp is provided for holding the saw $a$, but not so tight as to prevent said saw from being fed endwise therein. This clamp comprises a fixed jaw 17 on the face plate 4 and a co-operating jaw 18 on a hinged vise member 19. The timing of the crosshead is such that at the limit of the outward movement of the file, said crosshead will be lifted and be carried clear of the saw on its return movement. When the crosshead and file have reached approximately the limit of their return movement, they will be lowered so that the file will properly come into action on the teeth of the saw during the forward movement of the crosshead and file. When the crosshead and file have reached approximately the limit of their forward movement, upward movement is imparted to the crosshead and file, and at which time the tappet plate 12, acting on the screws 16, will operate the levers 10 and one thereof will impart an operative movement to the dog 15 that is turned down into operative position, thereby causing the same to produce the saw feeding movement.

To cause the operative driving dog 15 to engage the last filed tooth to impart the saw filing action, there is adjustably attached to the face plate 4, a guide cam arm 20 arranged to be engaged by a cam pin 21 on the operative dog 15 and carry said dog over the dull teeth of the saw during the operative movement of the dog 15 and direct the same against the last filed tooth. Said guide cam arm 20 also lifts the dog 15 from the last filed tooth at the completion of the filing action and holds the same out of contact with the unfiled teeth during the return movement of said dog.

Referring now in detail to the saw-tilting guide, which is the subject-matter of the present application, the numeral 22 indicates a bearing plate detachably secured to the face plate 4 by a nut-equipped bolt 23 which extends through an aperture in said plate and the slot 6 in said face plate. On the back of the bearing plate 22 is a lug 24 which fits into the slot 6 and holds said bearing plate from turning on the bolt 23, and said bearing plate also engages the face plate 4 at the upper end of said slot and properly positions said bearing plate.

A tilting saw guide member 25 is intermediately pivoted by a screw 26 to the bearing plate 22 for rocking movement about an axis in the plane of the saw filing action and in a vertical plane transversely thereto. Formed with the guide member 25 are end and intermediate bifurcated saw-holding lugs 27. These bifurcated lugs 27 securely hold saws of various different widths during the filing thereof. The guide member 22 is held frictionally clamped against the bearing plate 22 in different tilted positions by a thumb screw 28 which extends through a segmental slot 29 in said member, and has threaded engagement with said bearing plate. Obviously, by rocking the guide member 22, the saw $a$ may be tilted into different positions transversely of the saw filing action to vary the under cut of the teeth on said saw.

What I claim is:

1. In a saw filing machine, a file holder, means for imparting filing action to the file holder, and a tilting saw guide extending in a plane transversely to the filing plane, said saw guide being intermediately pivoted to rock about an axis in said saw filing plane.

2. In a saw filing machine, a file holder means for imparting filing action to the file holder, a tilting saw guide attachment comprising a bearing plate, means for rigidly securing the bearing member to the saw filing machine, a member intermediately pivoted to the bearing plate to rock about an axis in the filing plane and transversely thereof, and a bifurcated saw-holding lug on said member on each side of its pivot, and means for securing the guide member in different adjustment.

In testimony whereof I affix my signature.

FREEMAN E. COLLIER.